United States Patent
McFarlan

[15] 3,670,806
[45] June 20, 1972

[54] AIR CONDITIONING SYSTEM AND METHOD

[72] Inventor: Alden I. McFarlan, 691 Dorian Road, Westfield, N.J. 07090

[22] Filed: June 29, 1970

[21] Appl. No.: 50,874

[52] U.S. Cl. ............................................. 165/22, 165/63
[51] Int. Cl. .................................................. F24f 3/00
[58] Field of Search ............... 165/22, 26, 27, 28, 50, 62, 165/63, 64

[56] References Cited

UNITED STATES PATENTS 3,354,943  11/1967  McFarlan ............................. 165/22

Primary Examiner—Charles Sukalo
Attorney—Curtis, Morris & Safford

[57] ABSTRACT

Air conditioning systems having a plurality of refrigeration units with a hot water stream flowing through the condensers in series, and with a chilled water stream flowing through the evaporator-chillers in series. The system balances the heating and cooling loads so that the internally produced heat is used to heat the periphery when such heat is required. Excess heat is dissipated, and additional heat is provided when needed. The temperature of the hot water is higher than with the normal practice, and special advantages are obtained from the standpoint of providing efficient and dependable operations with wider ranges of the load and ambient conditions.

7 Claims, 2 Drawing Figures

INVENTOR.
Alden I. McFarlan
BY
Curtis, Morris & Safford
ATTORNEYS

AIR CONDITIONING SYSTEM AND METHOD

This invention relates to air conditioning systems and methods, and particularly to such systems which heat and cool the various zones or rooms of an overall project, e.g., a building or buildings. Illustratively, the system provides separate streams of chilled water and hot water which are carried through lines to various units which heat or cool the various zones, as required.

An object of this invention is to provide improved air conditioning systems and methods. A further object is to provide air conditioning systems which operate in an efficient and dependable manner throughout wide ranges of conditions of use. These and other objects will be in part obvious and in part pointed out below.

In air conditioning systems which heat and cool the various zones of an overall project by transferring heat from one zone to another, it is necessary to provide for critical heating loads and extreme cooling loads, even though these extreme conditions occur only rarely. It is also necessary to insure efficient and dependable operation throughout the entire range of intermediate heating and cooling load conditions which exist the vast majority of the time. It is important to insure satisfactory operation from all standpoints with minimum first cost and minimum operating costs.

In accordance with the present invention, the internally generated heat is used to heat the exterior zones when such heating is required. Excess in heat is delivered to a heat sink, and additional heat is added when there is a deficiency. The "breakeven temperature" is the outside air temperature at which the total loss of heat from the overall project to the outside air exactly equals the total heat gain, which is principally the internally created heat. The internally created heat includes the heat produced by the lights, the electrical equipment, the occupants and the components of the refrigeration system.

An increase in the internally created heat causes a drop in the breakeven temperature, because the breakeven temperature will not be reached until that increase in heat is represented by an increase in the heat loss. Conversely, a decrease in the internally created heat causes an increase in the breakeven temperature. Assuming a balanced heat condition for the overall project at a particular breakeven temperature, an increase in the cooling load or a reduction in the heating load will cause an excess of the internally generated heat beyond the heating requirements; and that reduces the breakeven temperature and additional heat must be added. However, the temperature of the heating water must also be increased to provide the required heating, because the air-heating coils must receive hot water at the increased temperature so as to deliver more heat to the air.

Adhering to the basic principle of not adding heat from an external source above the breakeven temperature and relying upon the refrigeration system as the sole heat source, at outside temperatures within the range just above the breakeven temperature, there would normally be a reduced cooling load and relatively low temperature hot water from the refrigeration system. Hence, when the low outside temperature produces a need for an increase in the temperature of the hot water from the refrigeration system, normally there is actually a decrease in that hot water temperature. In that way and others, the various types of refrigeration systems are limited in normal operation with respect to the ability to provide the desired increase in the hot water temperature at low outside temperatures. This is particularly evident when there is an extreme drop in the breakeven temperature.

A constant speed centrifugal compressor necessarily displaces enough refrigerant to satisfy its full capacity, and at reduced loads there must be means to provide a corresponding reduction in the capacity. Generally, this reduced capacity is obtained by means of inlet vanes which impose a reduction in the quantity of gas compressed. However, centrifugal compressors tend to surge at partial loads and high compression ratios. In order to avoid surging it is important to utilize the highest temperature for the water being cooled and the lowest possible temperature for the water which is cooling the condenser. As indicated above, that is a serious normal mode of the operation when it is desirable to have high temperature hot water with low outside temperatures.

With variable speed centrifugal compressors, such as is common with steam turbine driven units, the surging problem can be reduced, but there are still problems with respect to compression ratios and there are limitations on the normal maximum hot water temperature. With absorbtion systems there is a constant or fixed temperature of the hot water relative to any specific cold water temperature. Hence, with a drop in outside temperature, as discussed above, it is possible to increase the temperature of the cold water and thereby provide hot water of increased temperature. However, that produces serious control problems. Refrigeration systems having positive displacement compressors are also deficient from the standpoint of providing hot water at an increased temperature when there is a drop in the outside air temperature. The efficiency falls off as the compression ratio increases, and to some extent there is a reduction of the capacity.

The present invention overcomes the difficulties referred to above with respect to providing hot water at increased temperatures when there is a drop in the outside temperature at the breakeven temperature. However, the invention also provides important benefits even in systems which do not involve heat recovery for heating the outside zones. In accordance with the present invention, the temperature of the hot water from the refrigeration system is raised substantially above the normally accepted range at low breakeven temperatures, so that the hot water temperature is sufficient to maintain satisfactory heating. Also, at high outside temperatures, when heat is dissipated to a cooling tower or to another heat sink, the high temperature hot water carries away the required amount of excess heat and dissipates it with a smaller amount of water than would be required with lower temperature hot water. Hence, the system requires smaller pumps, control valves, and water lines, and less insulation, as well as smaller heat transfer coils if it is necessary to have more coil surface at the breakeven temperature than is required at the full cooling load. Also, the cooling tower will handle a smaller stream of hot water so that it can be of lesser horizontal area, thus occupying less roof space.

The present invention also contemplates that the temperatures of the water flowing to the chillers and to the cold water line can be higher than would be expected with the usual type of prior system. That permits the operation of the refrigeration units at higher temperature levels, so as to increase further the temperature of the hot water when that is desirable. Also, the invention contemplates wider ranges in the temperatures of the chilled water and hot water so as to give freedom of design and greater leeway in the mode of operation.

It has been recognized that the air conditioning of extremely tall buildings with chilled water and hot water from a central station in the basement creates serious problems. If the water lines were to extend directly from the basement to the tower of the building, the head pressures could not be tolerated. Hence, chilled water and hot water can be supplied to heat exchangers at an intermediate level in the building and the air conditioning from the spaces above that level can be carried on by streams of water which are chilled and heated by those exchangers and the return lines from above that level extend to those heat exchangers. In that way, the pressure head conditions are kept within acceptable limits. The staged heating and cooling of the streams of chilled water and hot water delivers to the heat exchangers the streams at higher temperature hot water and lower temperature chilled water more efficiently than is normally used for air conditioning purposes. Streams of chilled water and hot water are then taken off at intermediate stages in the refrigeration system so as to provide streams of water at the desired temperatures for the air conditioning in the lower portion in the building.

In the illustrative embodiment of the present invention, three staged refrigeration units are used which have constant-speed, centrifugal compressors. The stream of chilled water flows through staged evaporator-chillers of the three refrigeration units in series, and the stream of hot water flows through the condensers of the refrigeration units in the opposite direction. The two streams of water flow to air-treating units for heating and cooling the air, and there is a common return line through which all the water from the various air-treating units is returned to the refrigeration units where it divides to form the chilled water stream and the hot water stream. The system is so arranged that it provides relatively high temperature hot water and adequately cold chilled water. However, the system also has the very important characteristic that it will operate efficiently and dependably throughout the entire range between the maximum heating load and the maximum cooling load.

IN THE DRAWINGS

Figure 1:
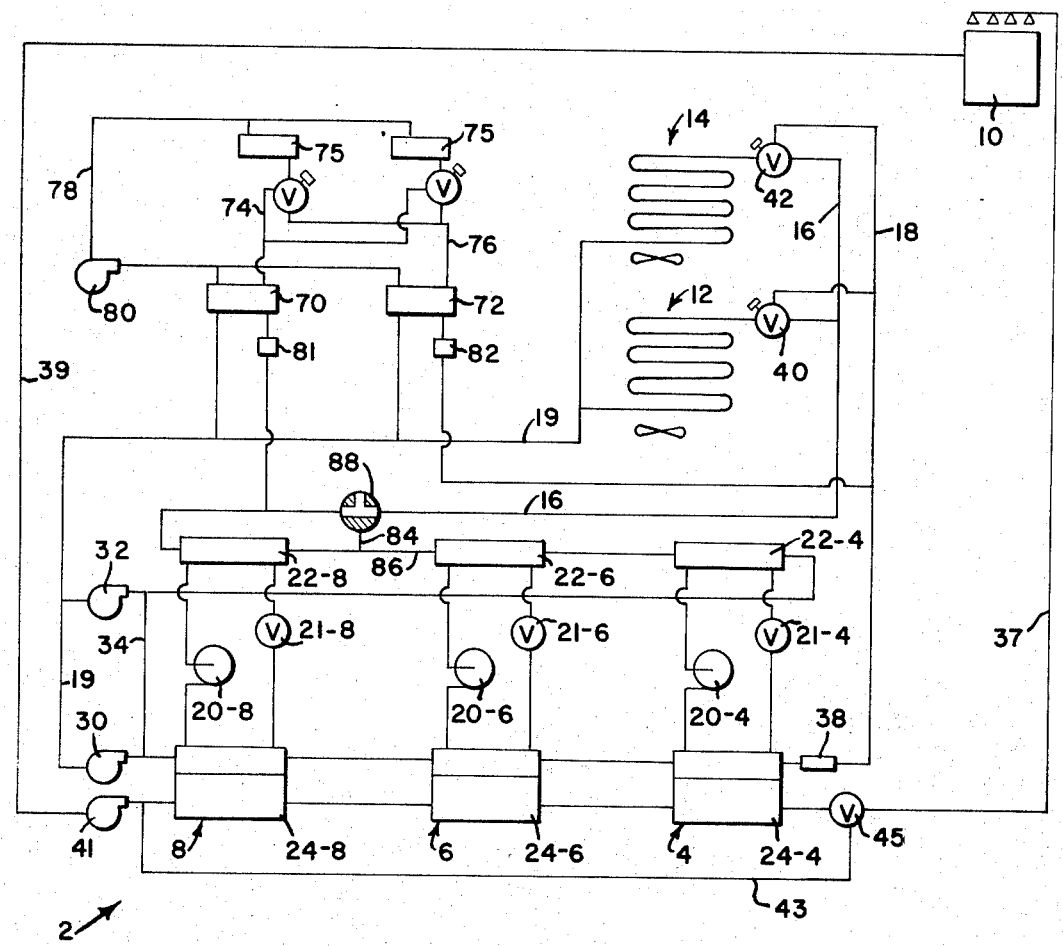
FIG. 1 is a schematic representation of one embodiment of the invention.

In the drawings, the air conditioning system 2 includes three refrigeration units 4, 6 and 8 at a central station, a cooling tower 10 and a large number of air-treating units which are represented by units 12 and 14. A chilled water line 16 and a hot water line 18 extends from the central station to each of the air-treating units and water from all of the air-treating units flows back to the central station through a common return line 19. Each of the refrigeration units has a constant speed, centrifugal compressor 20 driven by an electric motor (not shown), an evaporator-chiller 22, a double condenser 24 of the water tube and shell type and a restriction valve 21. The components of the respective refrigeration units are identified in the drawings by numbers with suffixes 4, 6 and 8, respectively. The water returning from the air treating units through line 19 flows to two pumps 30 and 32.

Pump 32 directs a stream of water in series through the evaporator-chillers 22-4, 22-6 and 22-8, and thence through the chilled water line 16. Pump 30 directs a stream of water in series through the condensers 24-8, 24-6 and 24-4, and thence through the hot water line 18. Hence, there is staged heating of the water by the condensers and staged cooling of the water by the evaporator-chillers. However, the staging of the heating in the series of refrigeration units is opposite to the staging of the cooling in the series, i.e., through the condensers of the series is opposite to the flow through the evaporators of the series. Therefore, the evaporator-chiller 22-4 of unit 4 receives the stream of water to be cooled at its highest temperature, and its associated condenser 24-4 receives its stream of water to be heated after it has been heated by condensers 24-8 and 24-6 and produces the highest temperature water and delivers the stream of hot water to line 18. Condenser 24-8 and evaporator 22-8 receive their streams of water at the respective lowest temperatures; and, the respective temperatures of the two streams of water flowing through condenser 24-6 and evaporator-chiller 22-6 are intermediate the respective highest and lowest temperatures of those streams. As will be explained more fully below, that reverse staging of the heating and cooling gives special advantages and insures efficient and dependable operation with systems of the type of the illustrative embodiment.

A balancing water line 34 interconnects the outlets of pumps 30 and 32 so that water may flow from pump 32 to condenser 24-4 and the hot water line, and water can flow from pump 30 to evaporator-chiller 22-4 and the chilled water line. A steam converter 38 in line 18 supplies additional heat to the stream of hot water when the operating conditions cause the temperature of the stream of hot water to drop below a predetermined level. Cooling water for the condensers flows by the action of pump 41 to and from the cooling tower through lines 37 and 39, respectively, the circuit being through the double-condenser circuit of condensers 24-8, 24-6 and 24-4 in that order, and then to the cooling tower. A bypass line 43 and valve 45 provide a flow path around the condensers for all or part of the water from the cooling tower. Units 12 and 14 have mixing valves 40 and 42, respectively, each of which has an inlet port from each of lines 16 and 18, and its outlet port to the coil of its unit. Each of these valves is operable to supply chilled water or hot water or a mixture of the two to the coil of its unit. However, as indicated above, all of the water which flows through all of these units is combined into a single stream in the return line 19.

Figure 2:
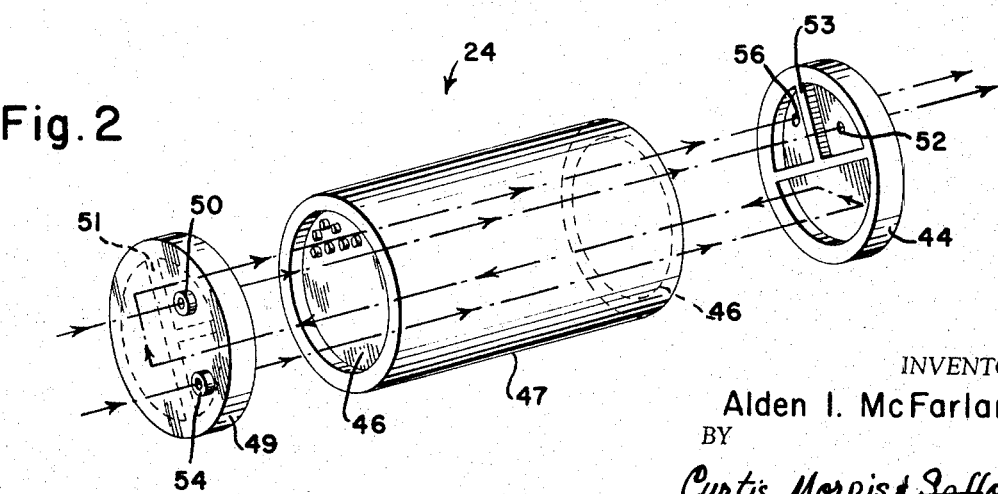
FIG. 2 is a somewhat schematic, exploded perspective view of one of the condensers of the system of FIG. 1.

The double condensers 24 are of the type shown in FIG. 2 with a shell 47, end plates 49 and 44, and water tubes mounted between a pair of tube plates 46 at the opposite end of the shell. The space between each of the end plates and its tube plate is baffled along quadrant lines, by baffles 51 and 53 on each of the end plates 49 and 44, to form two separate water-flow paths. One path is from the inlet connection 50 in end plate 42 through one quadrant of the tubes to an outlet connection 52 in plate 44. The other path is through the other three quadrants of tubes from inlet connection 54 in plate 49 through one quadrant of the tubes to end plate 44, then back to end plate 49 through another quadrant to the tubes, and thence through the other quadrant of tubes to the outlet 56 in end plate 44. The single quadrant circuit between connection 52 and 54 is the hot water circuit, and the three-pass or three-quadrant circuit is the circuit for the water which flows to the cooling tower. Hence, during operation when there is a substantial cooling load and the cooling tower is operating, the refrigerant is condensed by the cooling action of three quadrants of each of the condensers. However, when there is a substantial heating load and the cooling tower is operating, valve 45 is turned to bypass some or all of the water from the cooling tower through line 43 around the condensers. The refrigerant in each of the condensers then delivers most or all of its heat to the water in the hot water circuit, and in that way heat is delivered to the hot water at an increased rate up to the maximum rate.

With the system of the illustrative embodiment, a very wide range of load conditions is handled automatically and in an efficient and dependable manner. Unit 12 is illustrative of the units which cool and heat the air for the interior spaces. During normal occupancy, the interior space requires only cooling. However, in this embodiment, it is considered that the heat load in the interior space may be relatively small and a variable amount of hot water may be mixed with chilled water to provide the optimum temperature conditions. Also, when the building has been unoccupied for a long weekend during the heating season, the interior space requires some heating in preparation for occupancy. Unit 14 is illustrative of the units which supply heating and cooling for the peripheral space. That space requires chilled water or hot water or a mixture of the two, depending upon the outside temperature, the sun effect and the other normally understood variable conditions.

It has been indicated above that this invention has special advantages in extremely tall buildings. Accordingly, the chilled water line 16, the hot water line 18, and return line 19 extend to two heat exchangers 70 and 72. A three-pipe heating and cooling circuit extends from the heat exchangers to units 75 in the tower portion of the building, there being a chilled water line 74 and a hot water line 76 and a return line 78. A single pump 80 circulates the water, and the water temperatures in lines 74 and 76 are regulated by controllers 81 and 82 which operate valves to control the flow water from lines 16 and 18, respectively.

A chilled water line 84 extends from line 86 between evaporator-chillers 22-6 and 22-8 to a three-way valve 88. Valve 88 is shown in its position to direct chilled water from evaporator-chiller 22-8 to units 12 and 14. When in this position the entire stream of chilled water flows through evaporator-chiller 22-8. However, valve 88 may be turned to cause the chilled water flowing to units 12 and 14 to bypass evaporator-chiller 22–8. In that way the chilled water for units 12 and 14 is at a higher temperature than that which flows to heat exchanger 70, as discussed above.

In this embodiment, the temperature of the heated water is within the range of 90° to 135° F. In general that temperature is increased within that range when there is an increase in the heating load.

What is claimed is:

1. In a system for maintaining comfort conditions within a plurality of zones or spaces wherein one or more of the zones or spaces requires cooling when another requires heating, the combination of, a refrigeration system comprising a plurality of refrigeration units to provide separate streams of chilled liquid and heated liquid, means to supply said streams to air treating units and to return the liquid to the refrigeration system, the system being operative so that heat is withdrawn from one of said zones or spaces by the refrigeration system and is utilized to heat an exterior zone or space, means for discharging heat from the system when there is an excess of heat, said refrigeration units having evaporator-chillers which provide a series flow path for chilled liquid whereby a portion of the return liquid is chilled by stages, said refrigeration units having flow paths for the heated liquid by which the heat is discharged to the heated liquid from the refrigeration units along a flow path in series relationship opposite to the series relationship of said evaporator-chillers, each of said refrigeration units having a condenser with two sections, one of which provides a flow path for the heated liquid and the other of which provides a flow path for cooling water to carry away heat from the system, and control means to exert complete control upon the entire system to maintain the stream of heated liquid at a temperature within the range of 90° to 135° F. when heating is required in said another zone or space and to increase said temperature within said range in response to an increase in the heating load.

2. A system as described in claim 1 wherein each of said refrigeration units has a centrifugal compressor.

3. A system as described in claim 1 which includes auxiliary heating means for said stream of heated liquid.

4. In a system for maintaining comfort conditions within a plurality of zones or spaces wherein one or more of the zones or spaces requires cooling when another requires heating, the combination of, a refrigeration system comprising a plurality of refrigeration units to provide separate streams of chilled liquid and heated liquid, means to supply said streams to air treating units and to return the liquid to the refrigeration system, the system being operative so that heat is withdrawn from one of said zones or spaces by the refrigeration system and is utilized to heat an exterior zone or space, means for discharging heat from the system when there is an excess of heat, said refrigeration units having evaporator-chillers which provide a series flow path for chilled liquid whereby a portion of the return liquid is chilled by stages, said refrigeration units having flow paths for the heated liquid by which the heat is discharged to the heated liquid from the refrigeration units along a flow path in series relationship opposite to the series relationship of said evaporator-chillers, said means for discharging heat from the system comprising a cooling tower, and bypass means to provide a flow path for the liquid to and from said cooling tower without passing along said flow paths for heated liquid of said refrigeration units, and control means to exert complete control upon the entire system to maintain the stream of heated liquid at a temperature within the range of 90° to 135° F. when heating is required in said another zone or space and to increase said temperature within said range in response to an increase in the heating load.

5. In a system for maintaining comfort conditions within a plurality of zones or spaces wherein one or more of the zones or spaces requires cooling when another requires heating, the combination of, a refrigeration system comprising a plurality of refrigeration units to provide separate streams of chilled liquid and heated liquid, means to supply said streams to air treating units and to return the liquid to the refrigeration system, the system being operative so that heat is withdrawn from one of said zones or spaces by the refrigeration system and is utilized to heat an exterior zone or space, means for discharging heat from the system when there is an excess of heat, said refrigeration units having evaporator-chillers which provide a series flow path for chilled liquid whereby a portion of the return liquid is chilled by stages, said refrigeration units having flow paths for the heated liquid by which the heat is discharged to the heated liquid from the refrigeration units along a flow path in series relationship opposite to the series relationship of said evaporator-chillers, and control means to exert complete control upon the entire system to maintain the stream of heated liquid at a temperature within the range of 90° to 135° F. when heating is required in said another zone or space and to increase said temperature within said range in response to an increase in the heating load, and a secondary system comprising, auxiliary means to supply separate streams of secondary chilled liquid and secondary heated liquid to a plurality of secondary zones, secondary air-treating means for said secondary zones, control means to control the delivery of liquid from each of said secondary streams to said secondary air-treating means, two heat exchange units through which said secondary streams flow, respectively, means to supply liquid to one of said heat exchanger units thereby to produce said stream of secondary chilled liquid and to supply liquid to the other of said heat exchanger units to produce said stream of secondary heated liquid, and means to recirculate the liquid from said secondary air-treating means through said heat exchanger units.

6. The system as described in claim 1 wherein said liquid is returned to the refrigeration units by a single stream of liquid flowing from each of the air-treating zones.

7. The system as described in claim 1 wherein the core space of a building is formed by one or more of said zones and constitutes a cooling load during normal occupancy and use of the space, and wherein heat conduction loads at the peripheral walls constitutes a separate zone or zones.

* * * * *